Dec. 19, 1950  E. DRYDEN  2,534,424
HACKSAW BLADE
Original Filed Nov. 17, 1944
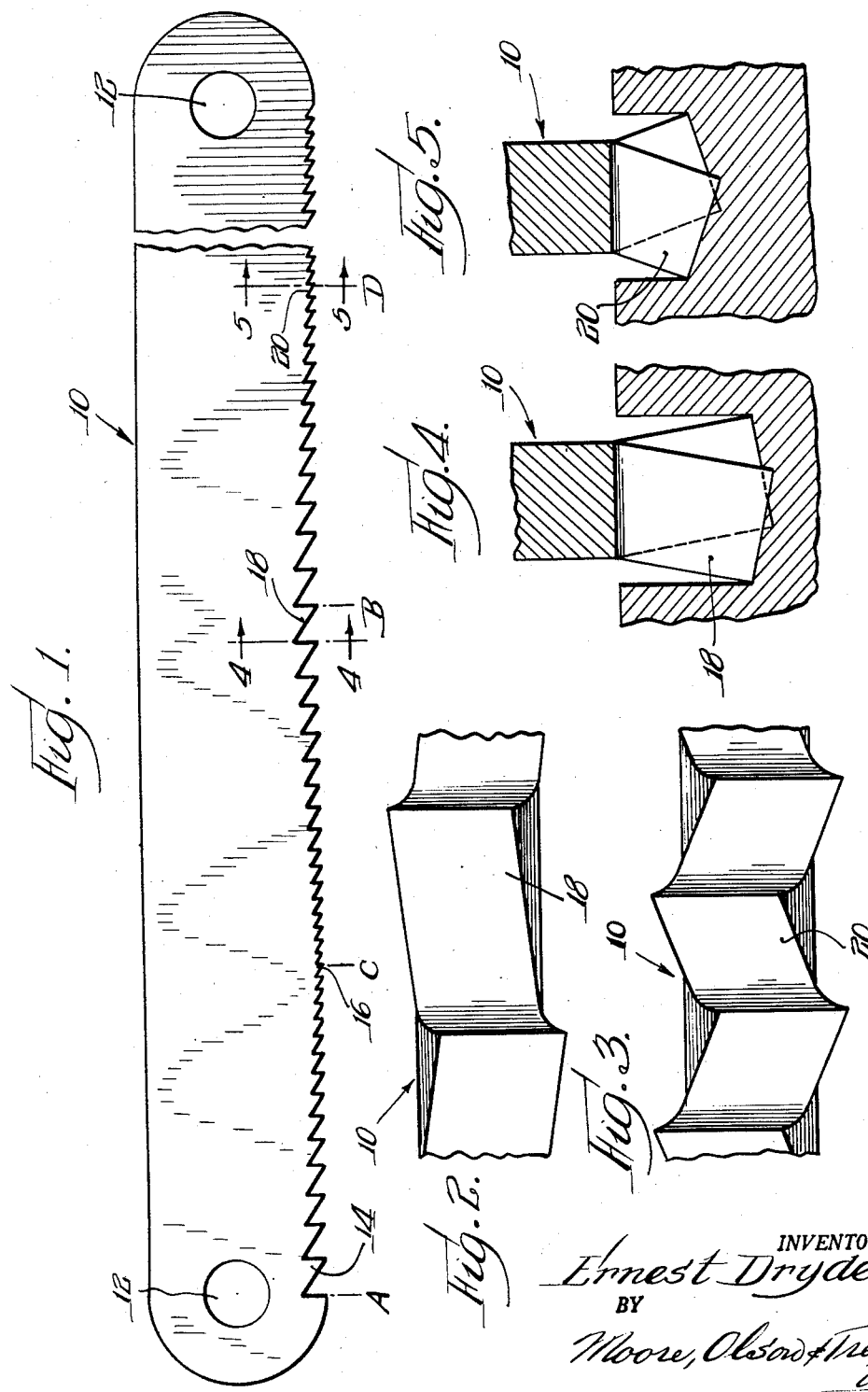
INVENTOR.
Ernest Dryden
BY
Moore, Olson & Trexler
Attys.

Patented Dec. 19, 1950

2,534,424

UNITED STATES PATENT OFFICE 2,534,424

HACKSAW BLADE

Ernest Dryden, Toronto, Ontario, Canada

Original application November 17, 1944, Serial No. 563,819. Divided and this application February 14, 1947, Serial No. 728,461

2 Claims. (Cl. 29—95)

1

This invention relates to improvements in saw blades and more particularly to saw blades of the hack saw type.

The present application is a division of my co-pending application relating to hack saw blade, Serial No. 563,819, filed November 17, 1944, and now abandoned. The present application is primarily concerned with improvements in hack saw blades and contemplates a novel arrangement of saw teeth, and to this end the invention proposes a graduation in saw tooth pitch which is such as to reduce blade breakage to a minimum.

More specifically, the present invention is concerned with an improved hack saw blade of the type referred to above wherein the gradual increase and decrease of saw tooth pitch is designed to avoid the tendency for metal particles to become lodged between the teeth.

It is a further object of the present invention to provide a hack saw blade in which the gradual variation in teeth is arranged to enable the functioning of fine and coarse pitch teeth during relatively short strokes of the blade.

Still more specifically, the present invention contemplates an arrangement of saw teeth of varying pitch as set forth above, wherein a group of teeth of one pitch is located intermediate spaced groups of a different pitch, each group gradually merging in pitch so as to insure the functional advantages referred to above.

The foregoing and other objects of the invention will be more apparent from the following detailed description when considered in connection with the accompanying drawing, wherein:

Figure 1 is a side elevational view of a hack saw blade provided with teeth arranged in accordance with the teachings of the present invention;

Figure 2 is an enlarged edge view of the teeth in the proximity of the section line 4—4 of Figure 1;

Figure 3 is an enlarged edge view of the teeth in the proximity of the section line 5—5 of Figure 1;

Figure 4 is a cross sectional view taken substantially along the line 4—4 of Figure 1, and;

Figure 5 is a cross sectional view taken substantially along the line 5—5 of Figure 1.

Referring now to the drawing wherein like numerals have been employed to designate similar parts throughout the various figures, it will be seen that a hack saw blade is designated generally by the numeral 10. This blade 10 is provided with conventional apertures 12 adapted for engagement with a pin or other cooperating member of a hack saw frame (not shown). The cutting edge of the blade 10 is composed of a series of identical sawtooth sections as indicated between the letters A and B. It will be noted that the blade section A—B is made up of a plurality of saw teeth, the tooth at the extreme left being designated by the numeral 14. The tooth 14 is representative of the largest tooth, and it will be seen that the teeth gradually decrease in size from the tooth 14 to the smallest tooth 16, this point being designated by the letter C. Continuing to the right from the tooth 16, the teeth gradually increase to a tooth 18 which is identical in size to the tooth 14. The arrangement just described is again repeated beginning from the tooth 18 at the point B, diminishing to the right to the smallest tooth 20 at the point D, which corresponds in size with the tooth 16.

Between the points A and B the teeth gradually decrease in size to the intermediate point C at which point the smallest tooth 16 is located. It will be seen therefore, that the invention contemplates a saw blade in which the teeth include a plurality of spaced, large, pitch teeth (teeth in the vicinity of the teeth 14 and 18) and a plurality of small pitch teeth (teeth in the vicinity of the tooth 16) located in the space between the large pitch teeth, the teeth positioned on opposite sides of the small or fine pitch teeth gradually increasing in pitch toward the large pitch teeth. Bearing in mind that the teeth also decrease in pitch from the tooth 18, namely, the point B, to the tooth 20, at the point D and to the tooth 16 at the point C, it may also be said that the invention contemplates a blade construction in which the teeth include a plurality of spaced small pitch teeth (namely, the teeth at the points C and D) with a plurality of large pitch teeth (namely, teeth at the point B) located intermediate the space between said small pitch teeth, the remaining teeth in said space progressively decreasing in pitch from the large pitch teeth in the vicinity of the point B to the small pitch teeth in the vicinity of the points C and D.

Figures 2 and 3 are edge views of the teeth at the points B and D, respectively. It also will be apparent from these figures that the outer corner of the teeth in Figures 2 and 3 lie in the same plane parallel to and spaced from the face of the saw blade body. Figures 4 and 5 illustrate the difference in size between the large or coarse pitch teeth and the small or fine pitch teeth. It will also be noted from Figures 2 to 5, inclusive, that the bottom points of the saw teeth are positioned in planes spaced at varying distances from the outer edge of the kerf shown in Figures 4 and 5, as does the bottom point of the coarse-pitch tooth. This arrangement reduces to a minimum the establishment of strains and stresses tending to cause fracture of the teeth or breaking of the saw.

It will be apparent from the foregoing description that the invention contemplates hack saw blades in which a novel graduation in saw tooth pitch is provided. The gradual blending of smaller teeth at one point, and larger teeth at another point, makes for ease and efficiency of operation. The accumulation of metal particles in the tooth spaces is reduced to a minimum, and a very short stroke of the blade serves to bring into cutting action teeth varying between the small and large pitch. As a result, possibility of blade breaking is reduced and the smooth, yet aggressive, cutting action of the teeth is assured.

Modifications and changes in structure may be made without departing from the spirit and scope of the appended claims.

The invention is hereby claimed as follows:

1. As an article of manufacture, a saw blade having a plurality of teeth along its cutting edge, said teeth consisting of a group of coarse pitch teeth, a group of fine pitch teeth positioned adjacent to one extremity of and gradually merging with said coarse pitch teeth, another group of coarse pitch teeth adjacent the opposite extremity of said group of fine pitch teeth and gradually merging therewith, and another group of fine pitch teeth merging with and positioned adjacent the opposite extremity of and gradually merging with said second mentioned group of coarse pitch teeth, the base of said teeth in the aggregate defining a wavy line extending longitudinally of the blade, whereby to minimize the extent of stroke required to operatively engage any of said teeth with a work piece.

2. An article of manufacture in accordance with claim 1, wherein each tooth differs in height from the next adjacent tooth so that the base of said teeth in the aggregate defines a constantly rising and falling wavy line.

ERNEST DRYDEN.

REFERENCES CITED

The following references are of record in the file of this patent:

UNITED STATES PATENTS

| Number | Name | Date |
|---|---|---|
| 1,214,589 | Rasmussen | Feb. 6, 1917 |
| 2,227,864 | Ronan | Jan. 7, 1941 |

FOREIGN PATENTS

| Number | Country | Date |
|---|---|---|
| 294,139 | Great Britain | May 22, 1921 |